G. M. KLEUCKER.
METHOD OF PRODUCING RAW WATER CAN ICE.
APPLICATION FILED JULY 7, 1915.
1,254,511.
Patented Jan. 22, 1918.
3 SHEETS—SHEET 1.
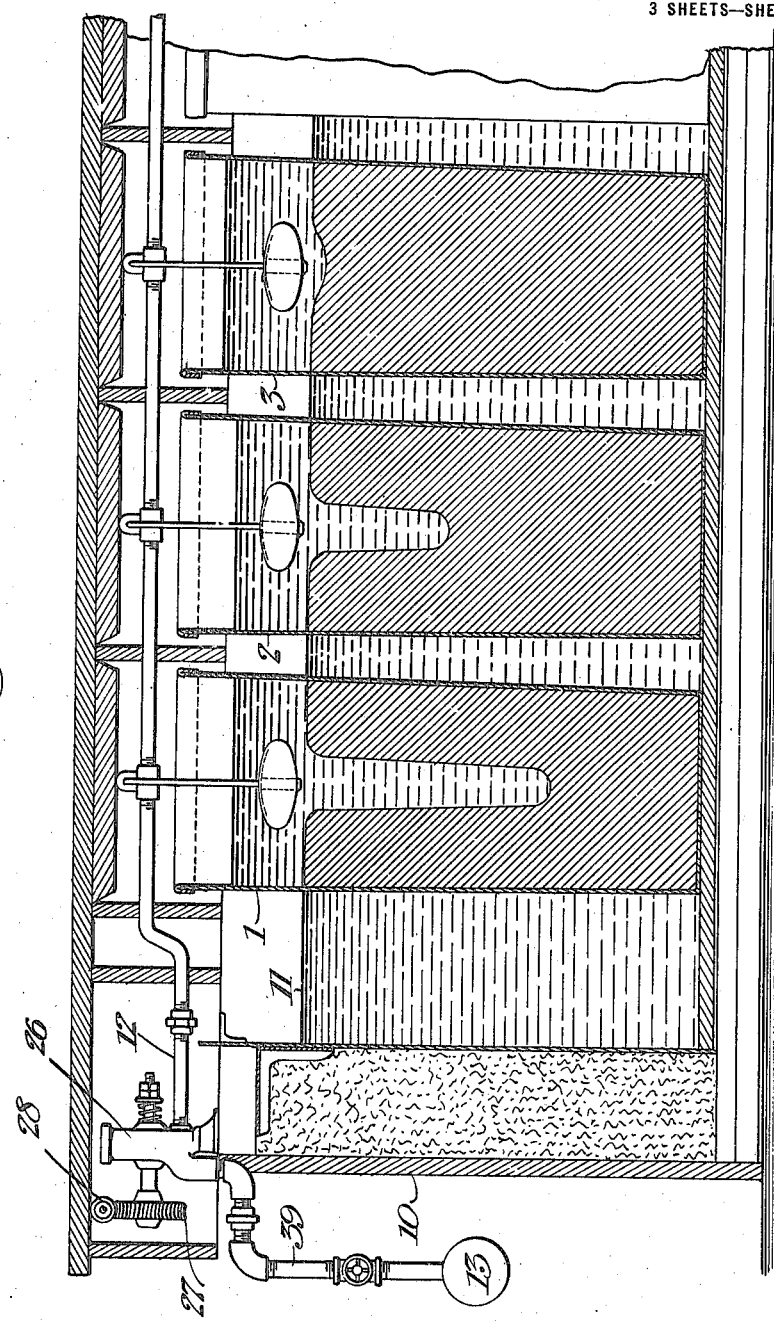

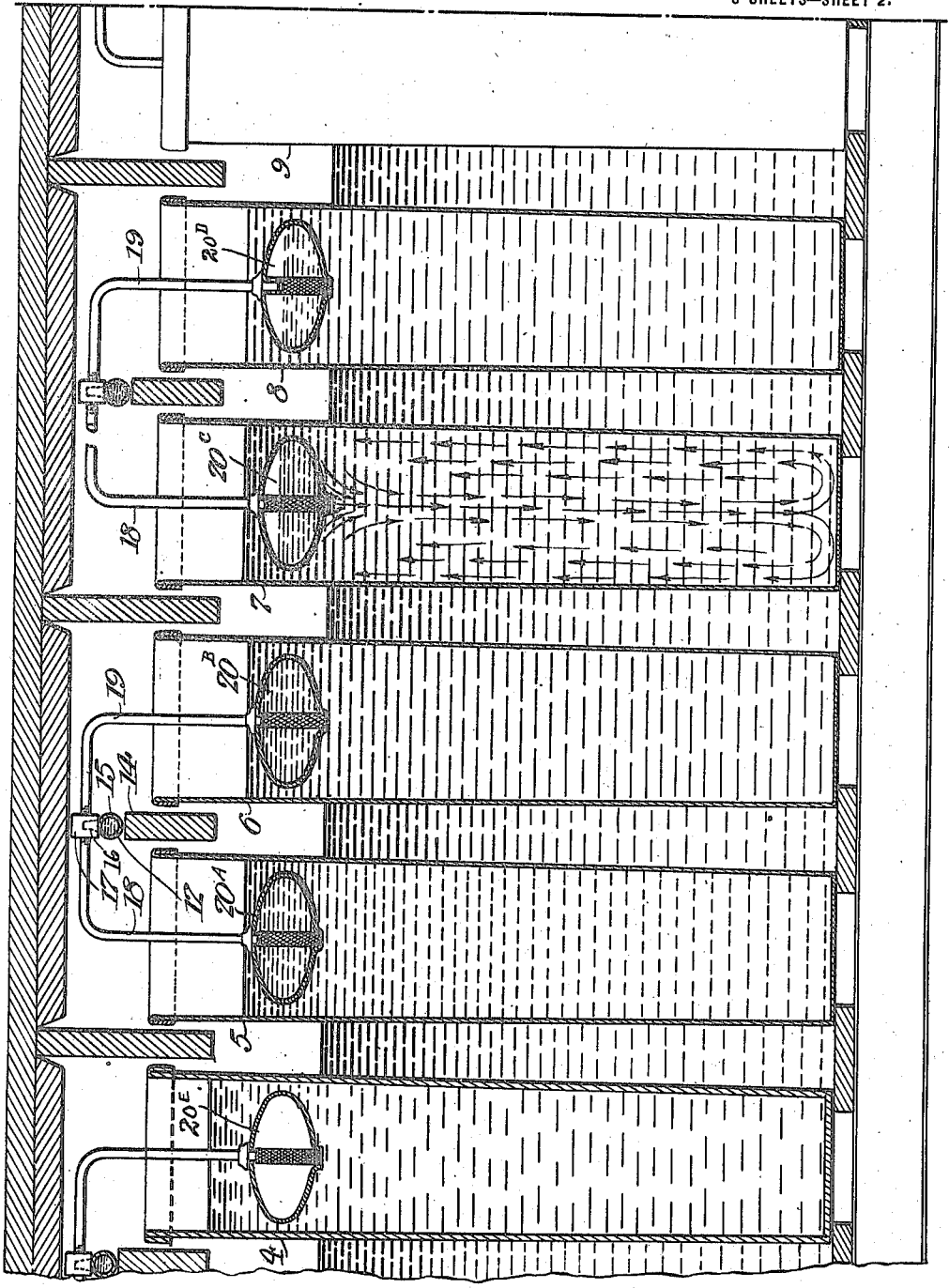

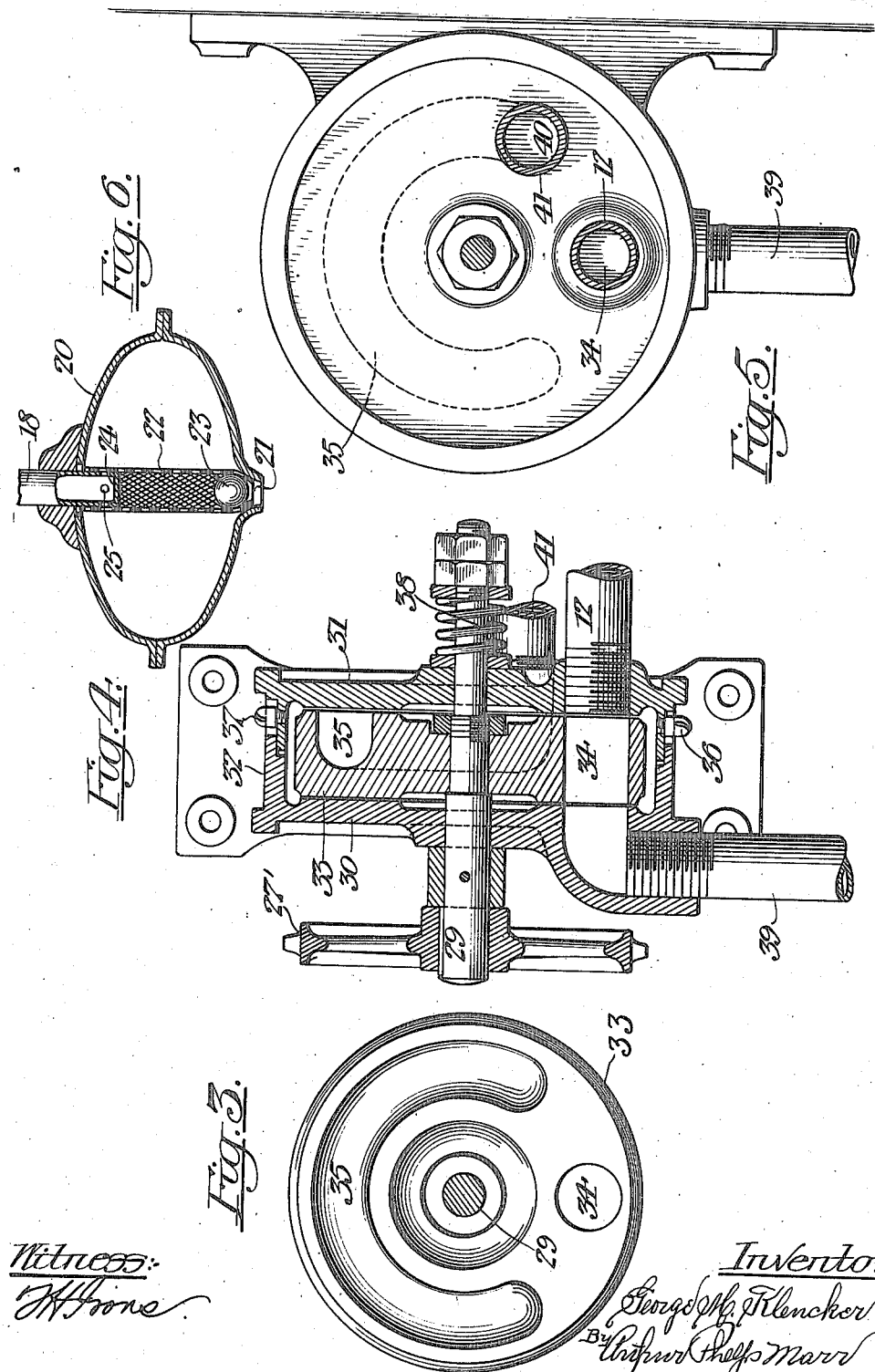

UNITED STATES PATENT OFFICE.

GEORGE M. KLEUCKER, OF ST. LOUIS, MISSOURI.

METHOD OF PRODUCING RAW-WATER CAN-ICE.

1,254,511.

Specification of Letters Patent.   Patented Jan. 22, 1918.

Application filed July 7, 1915.   Serial No. 38,448.

*To all whom it may concern:*

Be it known that I, GEORGE M. KLEUCKER, a citizen of the United States, and resident of the city of St. Louis, State of Missouri, have invented certain new and useful Improvements in Methods of Producing Raw-Water Can-Ice, of which the following is a specification.

My invention relates as suggested by the title to the production of what is termed artificial ice from raw water; raw water being understood to indicate water that has not been distilled and that may contain impurities which under ordinary methods of operation make it difficult as a base from which clear, thin ice may be produced.

In the past it has been customary to utilize a can the shape and size of which determines the shape and size of the finished ice-block.

When raw water is used under present existing conditions air is forced into and near the bottom of the liquid content of the can and, bubbling upward, carries with it the impurities in the water. It has not been found difficult to produce a clear shell in the ice pan as the impurities have been found to remain in suspension in the agitated water, but it has been necessary before the completion of the block to draw off the water contained in the core formed in the center of the block, wash out the core, substitute for the unclean water distilled water to be used in the final stage of freezing for filling the core, and completing the ice-block. It was also found necessary to slowly withdraw the air pipe and to watch carefully that this pipe did not become frozen in the completed block of ice. It is obvious that such a system requires much attention, but as it has been found quite satisfactory I do not describe it purely for the purpose of criticising, but only set it forth believing that by comparison the principles and advantages of my method may be more fully understood and more readily appreciated.

In my method air is not forced into the water but I provide instead an ingenious means for forcing water into the water in the can and thereby prevent the formation of air needles.

I do not utilize a pipe or other mechanical device in a position that would allow them to become frozen in the block. My agitating means is above the freezing line in the can and in addition to this advantage I make it unnecessary for the removal of the water from the core of the block and the substitution of distilled water therein, as the impurities in the water are cared for in a manner to be later described and which does not necessitate the manual labor formerly found necessary.

In my specification I set forth my method of operation together with the mechanical construction of the device which is well adapted to accomplish the desirable results.

The method and mechanisms will be fully described as the specification progresses.

The following is what I consider the best means of carrying out this invention and the accompanying drawings form a part of this specification in which:—

Figure 1 is a sectional view of a plurality of cans with certain of my mechanisms shown in elevation in relation thereto.

Fig. 2 on a slightly larger scale is a sectional view taken at right angles to Fig. 1, and shows a plurality of cans wherein is indicated the operation of certain of my devices.

Fig. 3 is a back elevation of the rotating disk of my valve member.

Fig. 4 is a sectional view of my valve member, the section being taken on an irregular line so that certain portions are shown in elevation.

Fig. 5 is a back elevation of the valve member.

Fig. 6 is a sectional view on a large scale of one of the receptacles used in a can.

Similar reference numerals indicate like parts in all of the figures where they appear.

In the description of my invention and in the drawings I will refer to the different steps of the operation of forming ice without an attempt to indicate the exact comparative conditions. I take this liberty for the sole purpose of making the description more concise and the drawings less numerous.

My method has to do with the formation of ice in receptacles usually called cans. I have shown a number of such cans in the drawings and I indicate these cans at 1, 2, 3, 4, 5, 6, 7, 8, and 9. The cans may be of any size or general shape. The cans usually used are oblong in shape and are arranged upon end and this is the shape and arrangement that I have adopted though I may desire that the cans utilized with my method should be slightly longer than the ordinary cans for a purpose that shall fully appear.

A tank 10 of ordinary well understood construction is provided and in this tank I arrange cooling coils submerged in brine. I have not shown the coils but have indicated the brine at 11.

Across the tank and arranged between pairs of cans is an air pipe 12 intermittently under a pressure obtained from a reservoir or compressor 13, and through the pipe 39 and through the perforation 34 in the valve disk 33. The pressure of air desirable in my method I have found to be about five to six pounds.

Between each pair of cans and arranged upon a suitable support 14 is a fitting 15 provided with a nipple 16. The nipple is really a portion of an automatic valve to which I make no claim in this application.

Upon the nipple 16 I arrange a block or fitting 17 provided with branch pipes 18 and 19, and when the fitting or block 17 is in position the air admitted to the pipe 12 may pass through the branch pipes 18 and 19. The pipes 18 and 19 extend into cans and there terminate in a member that I may term a chamber. One of these chambers is shown on a larger scale in Fig. 6 where 20 indicates a hollow, sealed chamber of generally oval outline, having an opening or perforation at the top through which a pipe 18 or 19 enters and a further opening 21 at the bottom.

Within the chamber 20 I arrange a tubular screen member 22, and in the tube 22 a ball 23 will be noted. The ball 23 may be of wood or a hollow metal ball. I desire that its specific gravity should be such that it will float in water.

It will be noted that the lower end of the pipe 18 shown in Fig. 6 is closed as indicated at 24 but that adjacent to the lower end of the pipe I arrange a plurality of transverse perforations indicated at 25.

It will also be noted that the perforation 21 in the chamber 20 is tapered. This taper provides a seat for the ball 23 and serving with the ball forms a valve for a purpose that shall be fully described.

I desire to call attention to the fact that I provide a chamber 20 for each of the cans and that in each of the cans the chamber is constantly submerged below the surface of the water contained in the can. I also desire to call attention to the fact that the water line in the can is higher than the top surface of the brine surrounding the can, and the difference in these liquid levels about equals the height of the chamber 20, although during the operation the water level in the can is changed in a manner to be described.

At 26 I have indicated a device that I refer to as a valve member. It will be noted that this member is connected in the air supply line between the source of supply and the point of delivery to the cans. I may provide a valve member 26 for each double row of cans as indicated in Fig. 1, or I may provide one valve member of greater capacity for an entire ice-making plant.

The valve member is shown in Fig. 1 where 27 indicates a worm gear driven by means of a rotating worm 28. In Fig. 4 a sprocket 27' is substituted for the worm gear 27 and is secured on a shaft 29 which passes through the front plate 30 and the back plate 31 of the valve member. These plates with the annular flange 32, shown as formed integral with the plate 30, comprise the casing of the valve.

Arranged within the valve casing and secured to and rotatable with the shaft 29 is the disk 33 shown in elevation in Fig. 3. This disk has a through perforation 34 and a semicircular recess in its back face as indicated at 35.

It will be noted that I have provided locating screws 36 and 37 in the valve casing and a spring 38 upon the shaft 29; the spring serves to retain a close contact or engagement between the disk or valve surfaces and the casing.

At 39 I show a pipe entering the valve member from the source of air supply, and 12 indicates the pipe through which the air is delivered to the proximity of the several ice cans. I desire to call attention to the perforation 40 shown in Fig. 5 as entering through the back plate 31 of the valve member. This perforation, which may or may not be fitted with a short length of pipe 41, should be open to the atmosphere and must be in the line of travel of the recess 35.

Thus far I have described the mechanisms that I have found necessary or convenient for the operation of my method. I will now describe the method of operation referring wherever necessary to the numerals by which the several parts are indicated.

Referring to Fig. 2, I show a plurality of cans filled with a desirable quantity of ordinary undistilled raw water, each can surrounded with brine the caloric of which is reduced by ammonia in the ordinary manner, or by any other known means. To obtain a rapid and proper formation of ice within the several cans it is desirable that the water contained therein be agitated. I have found that it is not necessary that the agitation be continuous but that a series of impulsive agitations, spaced short periods apart, will serve exceedingly well. I obtain these impulsive agitations in the following manner: The valve member 33 which is constantly rotated closes the passage from the pipe 39 to the pipe 12 and soon thereafter opens the pipe 12 to the atmosphere by passing the recess 35 over the end of the pipe 12 and the perforation 40, thus connecting the two. This motion of the valve will allow a portion of the water in the cans to be isolated from the main body of water in the can and enter the chambers 20; the chambers will become full and the water line in the cans will be lowered. By the time the chambers have filled, the perforation 34 assumes the position shown in Fig. 4 opening the passage between the pipes 12 and 39; the inrush of air into the pipe 12, and thus through the branch pipes 18 and 19, will force the water through the opening 21 out of the chambers 20 and the pressure is sufficient to force the water now under pressure to the bottom of its respective can.

When the water has left the chamber the ball valve 23 will be seated and the air in the chamber or the air supply from the pipe 12 cannot be uselessly discharged into the can. About this time the recess 35 of the valve member again opens the pipe 12 to the atmosphere, and the air blows out of all the pipes and all the chambers. The chambers are submerged and water will flow in and fill them replacing all the air which escapes through pipes 18, 19, the pipe 12, recess 35 and perforation 40, and when the chambers are again filled with water they are discharged in the manner indicated; thus it will be seen that in the continuous operation of my method I obtain a plurality of water discharges or impulses accompanied by an equal number of stops, at which time the water reënters the chambers 20.

It is well known that air cannot be forced into a receptacle containing water with any assurance of the agitation of the liquid contained in the said receptacle unless the air be entered in said receptacle at a low point; but in my method the air is used merely as a piston through the medium of which water is forced into water accomplishing an agitation found in every instance sufficient.

In Fig. 2 the chambers indicated at 20^A and 20^B are shown as filled with water and the water line in the cans 5 and 6 is at a low level. The recess 35 of the valve 33 which has been passing over the end of the pipe 12 and the perforation 40 is timed so as to leave the pipe 12 when the chambers 20^A and 22^B become filled with water.

The chambers 20^C and 20^D are being discharged, the water level in the ice cans 7 and 8 is raised and the arrows indicate the direction of movement of the discharged water in its downward and upward travel; the perforation 34 is now connecting the pipe 12 with the air pipe 39, and the air is forcing the water out of the chambers 20^C and 20^D.

The chamber 20^E is entirely empty, the water level in the ice can 4 is at its highest point and the chamber is ready to again receive a portion of the water in the can, by reason of the passage of the perforation 34 away from the pipe 39, and the movement of the recess 35 over the pipe 12 and the perforation 40 which opens the chamber 20^E to the atmosphere and allows the water to enter the chamber and displace the air therein, which by the closing of the pipe 39 and the opening of the perforation 40, is reduced to atmospheric pressure.

In connection with my method certain advantages are apparent. First, it is not necessary that the device used in my method or the ice cans, should receive constant attention. The chambers 20 being above the brine or freezing line, cannot become frozen in the ice block.

No core is formed in the ice in my method, for although the center freezes more slowly than the edges, as in all methods, the circulation continues until the ice block is completed, and all impurities, whether in suspension or solution, will be carried upward into the non-freezing zone in the can leaving the ice block clean and transparent.

I may find it advantageous to reduce the pressure of the air during the later steps of the freezing so that the agitation of the water will not be so great as to produce too large a final cavity or cup; thus far, however, I have not found this necessary.

All the impurities in the water, are, by the agitation, forced to the top, and when the block is completed the water remaining on the top may be dumped, but I prefer that it should be drawn off to be used in pre-cooling the fresh supply of water to be furnished in the making of the ice. If, however, this small amount of water should be thrown away the loss resulting therefrom will be found to be exceedingly slight, certainly not greater than the loss which accompanies the withdrawing of the core water in other methods of operation.

I do not confine myself to the shape of the chambers 20 as shown. I may make them rectangular or any other suitable shape.

Nor, do I confine myself to the particular valve as shown for regulating the supply of air. I may use the equivalent of an angle cock or I may use a large air compressor and let the alternate suction and discharge serve the purpose of the valve shown.

Having carefully and fully described my invention to the best of my ability, what I claim and desire to secure by Letters Patent, is—

1. The method of producing raw water can ice which consists of supplying to a can a quantity of water greater than required for the ice to be produced therein, allowing a portion of said water to flow away from the main body of water while still retaining it within the can then forcing the portion which has flown away into and through the remainder of said water to obtain an agitation thereof, and freezing said water as and for the purpose set forth.

2. The method of producing raw water can ice which consists of supplying to a can a quantity of water greater than required for the ice to be produced therein, allowing a portion of said water to flow away from the main body of water and retaining it below the surface thereof, then forcing the portion which has flown away into the main body of water to obtain an agitation thereof and freezing said water.

3. The method of producing raw water can ice which consists of supplying to a can a quantity of water greater than required for the ice to be produced therein, allowing a portion of said water to be separated and flow away from the main body of water retaining all of the separated water within the non-freezing zone within the can, then forcing that portion which has flown away into the main body of water to obtain an agitation thereof and removing sufficient heat from said water to produce ice in said can.

4. The method of producing raw water can ice which consists of supplying to a can a quantity of water greater than that required in the production of the ice, allowing a portion of said water to flow away from the main body at atmospheric pressure and retaining it within the non-freezing zone, then subjecting said separated water to a pressure of air above the atmospheric pressure thus forcing it into the body of water in the can at a velocity which will cause agitation and freezing said water.

Signed at the city of St. Louis, State of Missouri, this 21st day of June, 1915, in the presence of these two witnesses.

GEORGE M. KLEUCKER.

Witnesses:
ALBERT BAUM,
WM. A. KINNECK.